(12) United States Patent
Wada et al.

(10) Patent No.: US 6,480,812 B1
(45) Date of Patent: Nov. 12, 2002

(54) VORTEX FLOWMETER

(75) Inventors: Masami Wada, Tokyo (JP); Masanori Hondo, Tokyo (JP); Tetsuo Andoh, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 198 days.

(21) Appl. No.: 09/645,258

(22) Filed: Aug. 24, 2000

(30) Foreign Application Priority Data

Sep. 14, 1999 (JP) .......................................... 11-260752
Jul. 3, 2000 (JP) ....................................... 2000-200846

(51) Int. Cl.[7] ............................. G01F 1/32; G06F 19/00
(52) U.S. Cl. ........................ 702/191; 702/45; 73/861.22
(58) Field of Search ............................. 702/45, 48, 54, 702/191; 73/861.22, 861.23, 861.24, 861.25, 861.19

(56) References Cited

U.S. PATENT DOCUMENTS

| 5,372,046 A | * | 12/1994 | Kleven et al. | 327/311 |
| 5,429,001 A | * | 7/1995 | Kleven | 327/552 |
| 5,503,035 A | * | 4/1996 | Itoh et al. | 73/861.23 |
| 5,576,497 A | * | 11/1996 | Vignos et al. | 73/861.18 |
| 5,675,091 A | * | 10/1997 | Lew et al. | 73/861.22 |
| 5,841,035 A | * | 11/1998 | Andoh et al. | 73/861.22 |
| 5,942,696 A | * | 8/1999 | Kleven | 73/861.22 |
| 6,170,338 B1 | * | 1/2001 | Kleven et al. | 73/861.22 |
| 6,212,975 B1 | * | 4/2001 | Cook | 702/190 |

OTHER PUBLICATIONS

Hondoh et al., "A Vortex Flowmeter with Spectral Analysis Signal Processing", IEEE, Nov. 2001.*

* cited by examiner

Primary Examiner—Patrick Assouad
(74) Attorney, Agent, or Firm—Moonray Kojima

(57) ABSTRACT

The invention encompasses a vortex flowmeter for measuring the flow rate of a fluid by detecting an alternating signal produced by Karman vortices using a sensor comprising a low pass filter for passing the frequency band of the alternating signal that is determined by the diameter and flow rate range of the vortex flowmeter; subband filters for splitting the frequency band passing through the low pass filter into a plurality of component bands; a spectrum analyzer for analyzing the plurality of component bands; and a bandpass filter for passing a frequency band to be measured according to the analysis results of the spectrum analyzer, thereby providing flow rate measurement with high precision.

28 Claims, 19 Drawing Sheets

FIG. 6
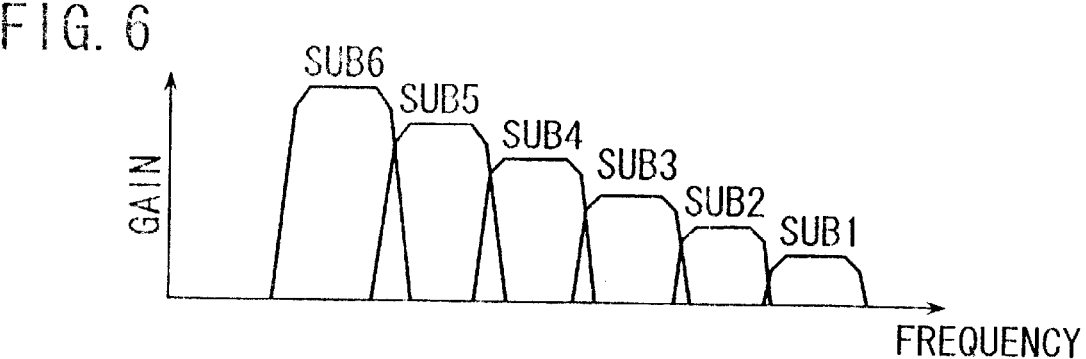
FIG. 7 (a)
(b)
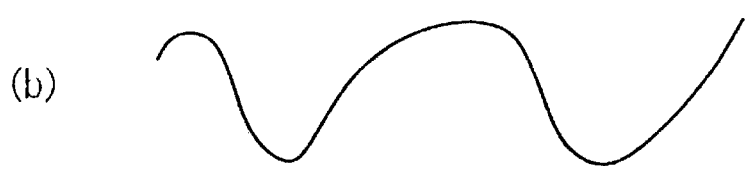
FIG. 8
(a) SPECTRA
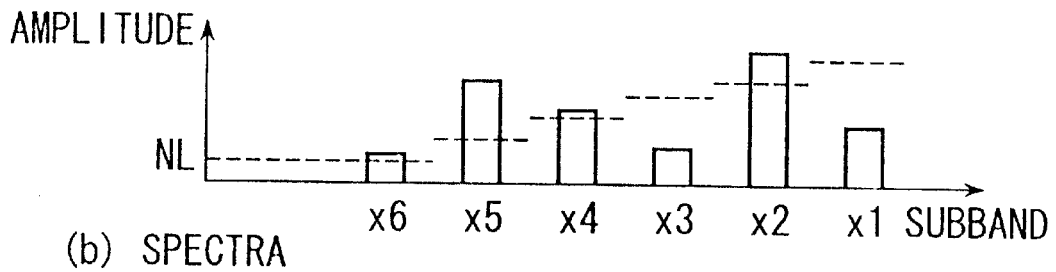
(b) SPECTRA
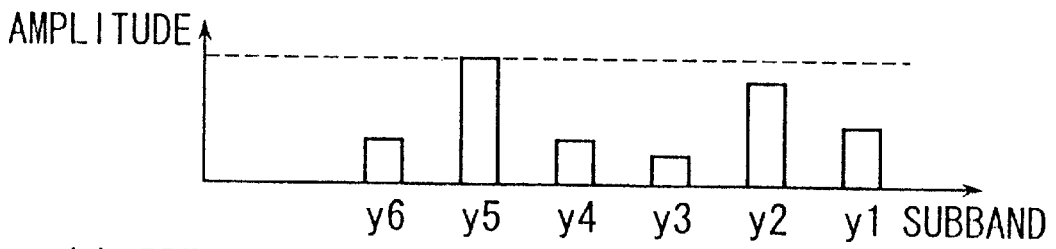
(c) BPF SETTING
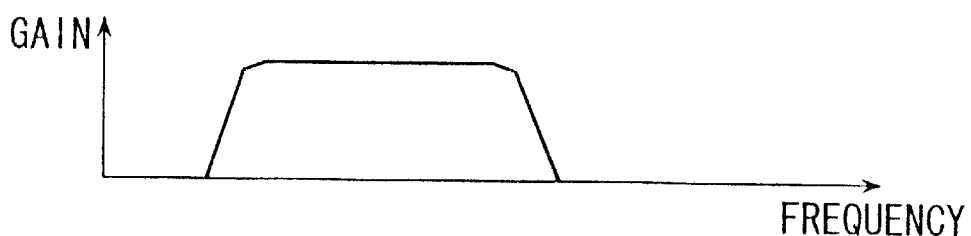

FIG. 9
(a) SPECTRA
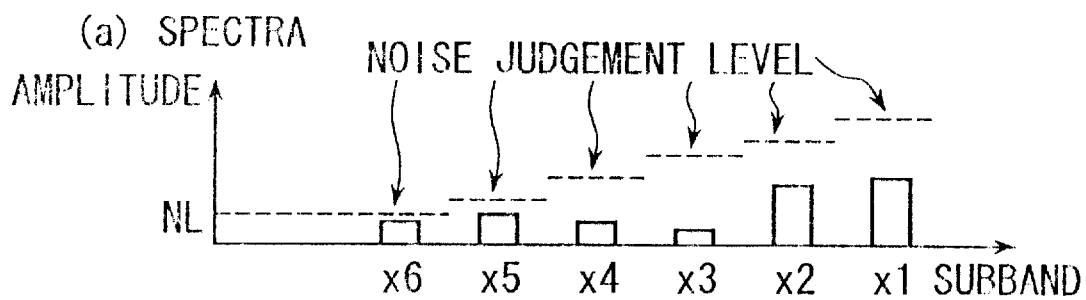
(b) BPF SETTING
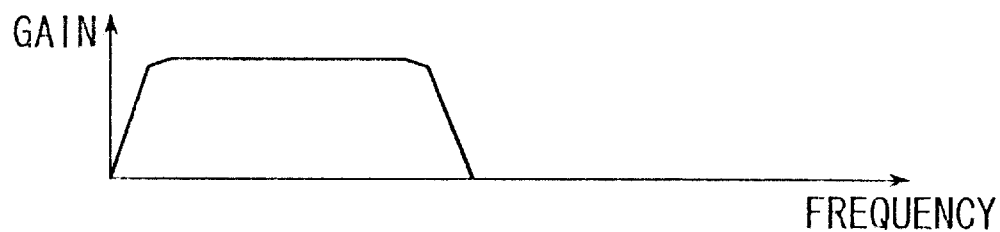
FIG. 10
(a) SPECTRA
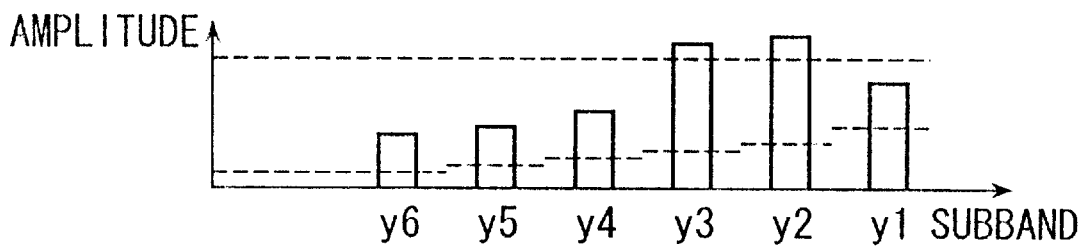
(b) BPF SETTING
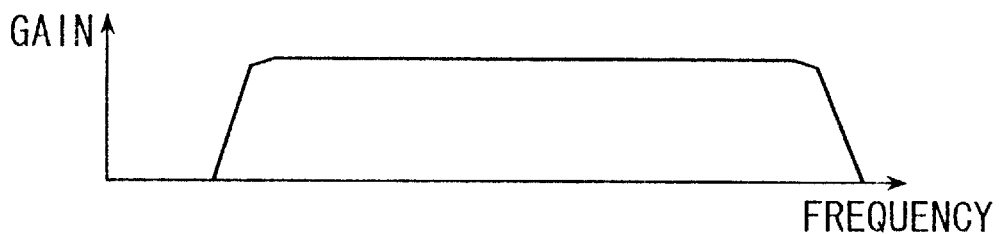

31 AMPLITUDE MEASUREMENT CIRCUIT n bit SHIFT-RIGHT
$k=1/2^n$

VORTEX FLOWMETER

BACKGROUND OF THE INVENTION

1. Field of Invention

This invention relates to a vortex flowmeter for measuring the flow rate of a fluid by detecting an alternating signal produced by Karman vortices, wherein a vortex flow rate signal, obtained by an alternating signal passed through a filter and A/D converted, is processed using a microprocessor. More particularly, the invention relates to an improved vortex flowmeter which is characterized by stable flow rate detection.

2. Description of the Prior Art

A vortex flowmeter utilizes the fact that the frequency, at which Karman vortices occur behind a vortex shedder placed in a fluid being measured, is proportional to the flow velocity of the fluid. The vortex flowmeter is widely used to measure flow rates of various fluids because of the flowmeter's simple structure, wide measurement range, and high measurement accuracy.

FIG. 1 shows an example of a conventional vortex flowmeter, wherein only one sensor is shown, but which can utilize more than one such sensor. An AC charge signal, outputted from a piezoelectric element 1, is converted to an AC voltage signal by a charge converter 2 and the voltage signal is amplified by amplifier 3. The voltage signal amplified by the amplifier 3 carries noise components, in addition to the frequency band being measured. The noise components are removed by a bandpass filter 4. The signal which is passed through the bandpass filter 4 is converted to a pulse signal by a Schmitt trigger 5. The bandpass filter 4 is designed so that the optimum band is selected by means of a microprocessor 7, which may also be referred to as a central processing unit (CPU), according to the diameter of the vortex flowmeter, fluid density and maximum flow rate.

The signal made into pulses by the Schmitt trigger 5 is introduced to the microprocessor 7, where the pulse signal is subjected to frequency, flow rate and corrective calculations that are performed by calculation means included in the microprocessor 7 using multipliers and calculation programs desired for flow rate calculation. Then, the microprocessor 7 outputs a pulse signal corresponding to the flow rate signal. This pulse signal is converted into an analog signal by a frequency-to-voltage (F/V) converter 8, and then outputted after being changed by a voltage-to-current (V/I) converter 9 into a signal of desired output mode (e.g. a 4–20 mA signal).

The noise components that are superposed on the vortex signal component of the conventional vortex flowmeter include, for example, (a) noise due to the vibration of the piping; (b) low frequency noise such as beat noise; (c) high frequency noise due to, for example, the resonance of the vortex shedder; and (d) spike noise. Although it is possible to significantly reduce the amount of the foregoing noises using a bandpass filter 4, the remaining amount of noise still adversely affects the signal component. Thus, noise components may also be accidently pulsed by the Schmitt trigger 5 into a signal component or the Schmitt trigger 5 may fail to pulse the original signal component.

To solve such problems, it has been suggested in the prior art that following the pulsing of the vortex frequency signal, a judgment be made in an ON-OFF manner using noise judgment means with use of a converted frequency provided by an amplitude-to-frequency (A/F) converter 6, in order to determine whether the component in question is a noise or a signal. However, if the high frequency noise is superposed on a vortex signal, the number of pulses is thus increased the vortex signal is outputted directly as a flow rate signal. This results in reduced accuracy.

SUMMARY OF THE INVENTION

Accordingly, an object of the invention is to overcome the aforementioned and other deficiencies and disadvantages of the prior art.

Another object is to provide a vortex flowmeter wherein a low pass filter and means for splitting the frequency band passing through the low pass filter into a plurality of component frequency bands, are located in front of the bandpass filter, the band of the vortex frequency being analyzed according to the signal strength of each band of the component frequency bands, and the band of the bandpass filter being controlled according to the analysis results, whereby flow rate measurement is attained with high precision.

BRIEF DESCRIPTION OF THE DRAWINGS

FIG. 6 is a graph depicting the relationship between frequency and gain.

FIG. 7 are two waves (a) and (b) depicting the way noise with a high frequency band is superposed on a signal with a low frequency band.

FIG. 8 shows spectra diagrams (a) and (b) illustrating the relationship between amplitude x and the subbands, and a graph (c) indicating the range of the bandpass filter.

FIG. 9 are graphs (a) and (b) depicting the relationship between amplitude x and frequency of each subband when the flow rate is zero and indicating the state of a bandpass filter when the pass band thereof is set to be within the minimum flow velocity centered on the pass band.

FIG. 10 are graphs (a) and (b) depicting the relationship between the saturation detection level SL and the amplitude x of each subband and indicating the state of a bandpass filter with an expanded pass band.

DETAILED DESCRIPTION OF THE PREFERRED EMBODIMENTS

Figure 1:
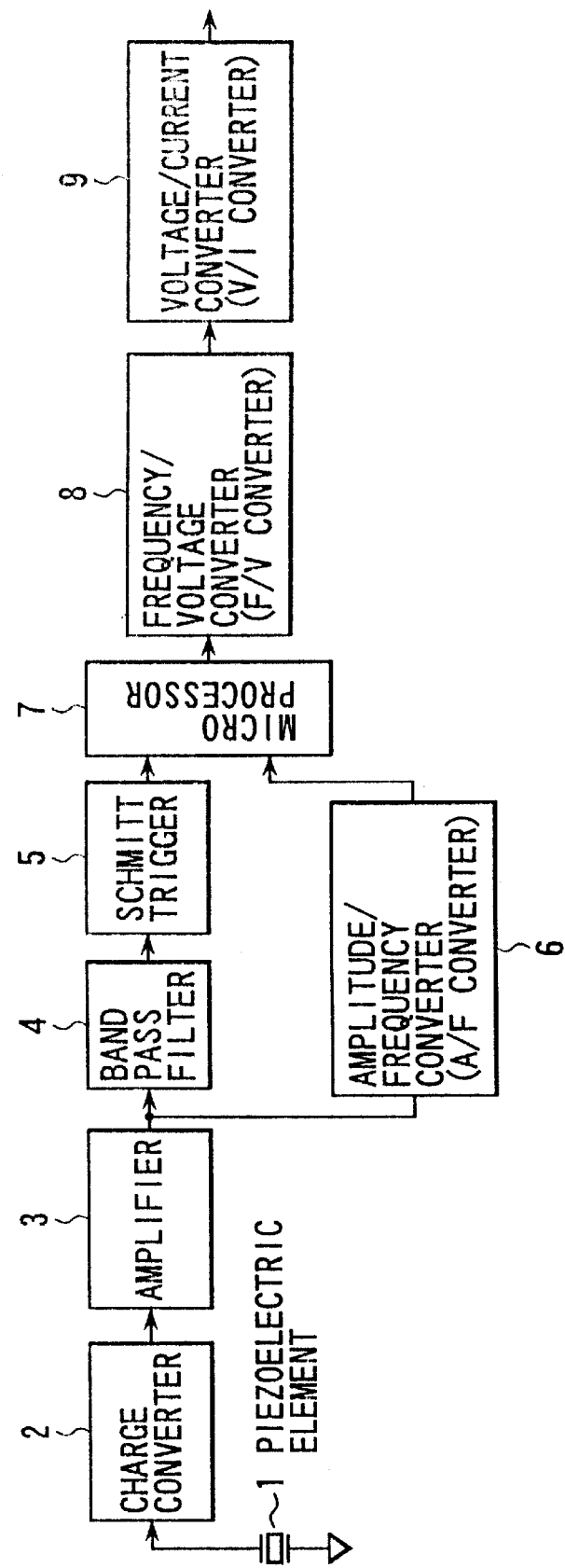
FIG. 1 is a block diagram depicting a conventional vortex flowmeter.
Figure 2:
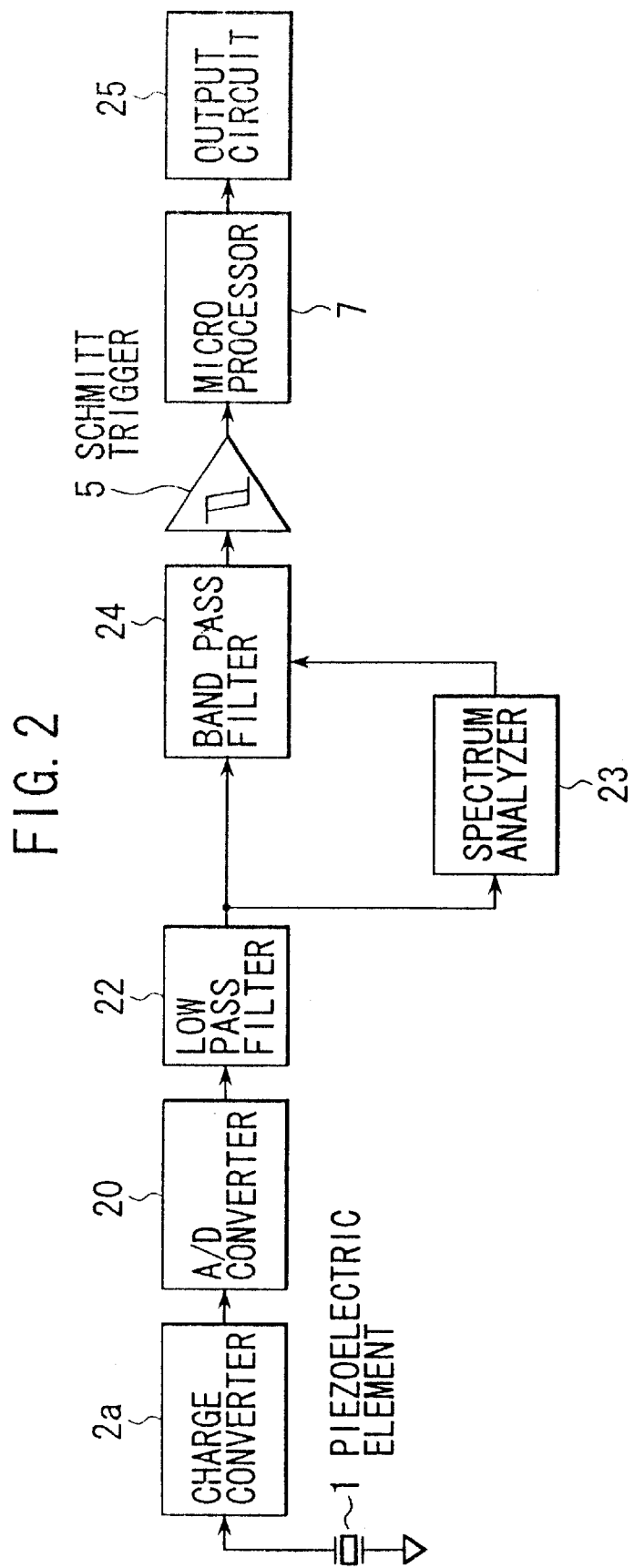
FIG. 2 is a block diagram depicting an illustrative of the embodiment of the invention.

FIG. 2 shows an illustrative vortex embodiment of the invention, wherein elements that are the same as those shown in FIG. 1 are provided the same reference symbols, and are not discussed hereat for sake of clarity. Although only one sensor is shown in FIG. 2, more than one sensor can be used. The embodiment comprises a charge converter 2a, which includes an amplifier 3, e.g. as shown in FIG. 1; an A/D (analog to digital) converter 20 for converting an analog signal passing through charge converter 2a into a digital signal; and a low pass filter 22 for removing high frequency components from the output signal (e.g. the vortex flow rate signal) of the A/D converter 20.

A spectrum analyzer 23, which comprises a plurality of subband filters (which may be of digital filters, as discussed hereinafter) and a judgment circuit, is provided and functions to split the frequency band of a signal passing through the low pass filter 22 into a plurality of component bands to determine which of the split component bands contain the signal to be measured. A bandpass filter 24 passes a signal to be measured according to the analysis results from spectrum analyzer 23. A Schmitt trigger 5 converts the signal, passed through bandpass filter 24, into a pulse signal.

The pulse signal is then supplied to microprocessor 7, wherein the pulse signal is subjected to frequency, flow rate, and corrective calculations, that are performed by calculation means included in the microprocessor 7, using multipliers and calculation programs suitable for flow rate calculations. Then, the microprocessor 7 (which in this specification may also be referred to as a CPU) outputs a pulse signal corresponding to a flow rate signal. The pulse signal is converted into an analog signal by an F/V converter (not shown in FIG. 2) that may be part of an output circuit 25, and then outputted after being changed by a V/I converter (also not shown in FIG. 2) to a signal of a desired output mode, such as for example, a 4–20 mA signal.

Figure 3:
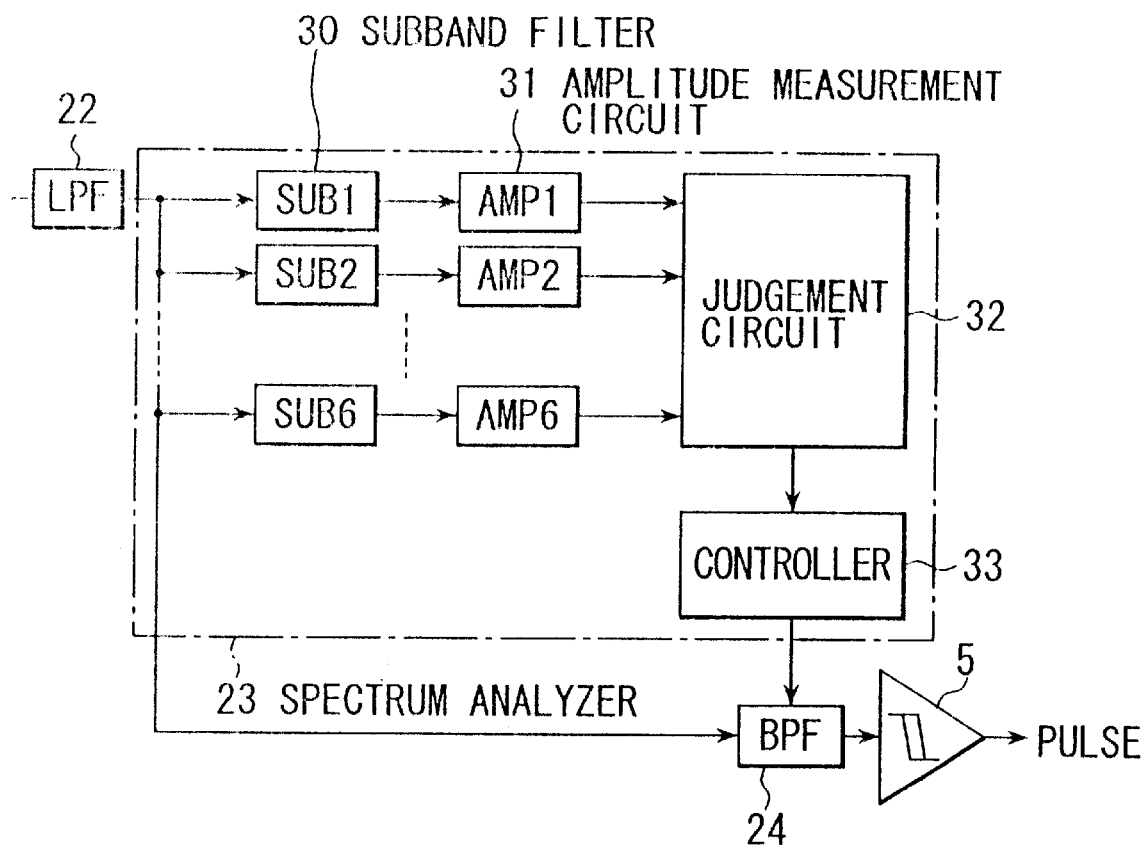
FIG. 3 is a block diagram depicting a spectrum analyzer used in the invention.
Figure 4:
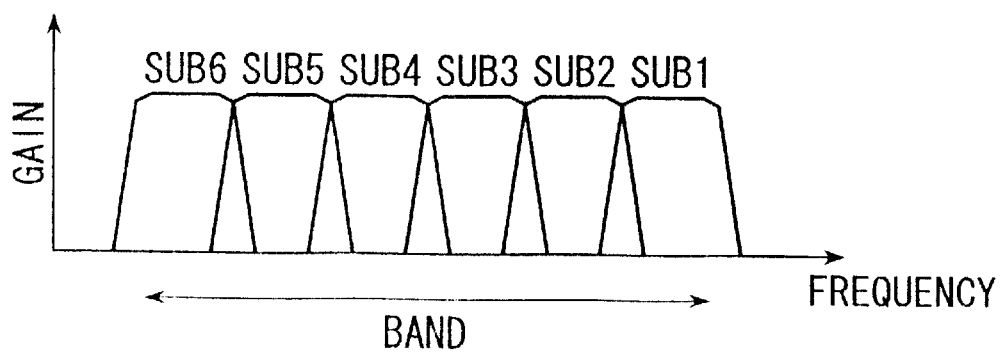
FIG. 4 is a graph depicting the splitting of the bandwidth of the signal being processed into six component bands.

FIG. 3 shows a spectrum analyzer 23 comprising subband filters 30 comprising SUB1 to SUB6, whereby the band of a signal to be process is split into, for example, six component bands, as shown in FIG. 4. The invention is not limited to splitting into six bands; but, can be as many as desired.

The band of the vortex signal is determined by the diamter and flow rate range of the vortex flowmeter The divisions of the band thereby obtained are hereafter referred to as sub-bands (also shown herein as sub-bands).

Referring back to FIG. 3, amplitude measurement circuits 31 comprise AMP1 to AMP6 and measure the amplitude of each subband as shown in FIG. 4 Each amplitude measurement 31 is a combination of an absolute value circuit and a low pass filter or a combination of a square law circuit and a low pass filter. The judgment circuit 32 compares the amplitudes of the individual subbands to determine which subband has the vortex signal. The pass band of the bandpass filter 24 is controlled by means of a controller 33, so that a subband, determined by the judgment circuit 32, is centered in the pass band.

Figure 5:
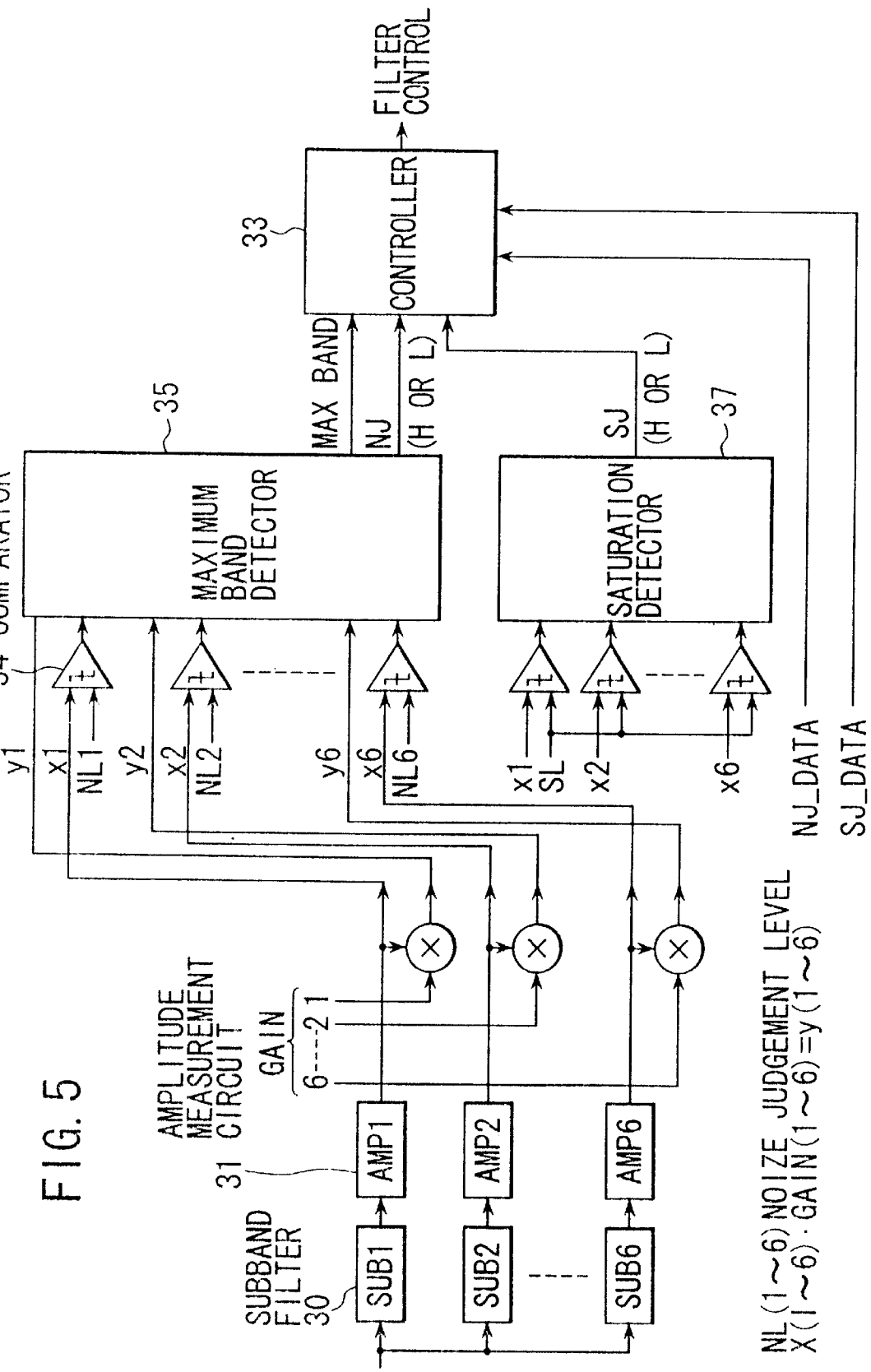
FIG. 5 is a diagram depicting details of a spectrum analyzer used in the invention.

The method of identifying the vortex signal will now be described with reference to FIG. 5, which shows details of a spectrum analyzer. The amplitudes of the individual subbands X1 to X6 are provided by the amplitude measurement circuits 31. The amplitudes of the individual subbands are multiplied by GAIN1 to GAIN6, having different values, to obtain outputs y1 to y6. FIG. 6 shows the relationship between the frequency and gain of each subband, where the outputs y1 to y6 equal the amplitudes of the signals passed through the bandpass filters having different gains, The filters have the different gains because GAIN1 to GAIN6 differ from each other.

As described, the amplitude of a signal provided by a vortex flowmeter is determined by the diameter, fluid density and flow velocity. The sensing methods used for vortex flowmeters include stress detection, pressure detection, and ultrasonic detection. The stress detection method uses the principle that the amplitude of the signal is proportional to the fluid density and the square of the flow velocity. The ultrasonic detection method is based on the principle that the amplitude of the signal is proportional to the sonic velocity and the flow velocity of the fluid. In either method, the amplitude increases as the flow velocity increases, i.e. the frequency rises. Hence, the gain of a subband with a lower frequency is set to a larger value, whereas the gain of a subband with a higher frequency is set to a smaller value.

The relationship between the frequency and the amplitude is predictable to some degree, so that noise judgment levels NL may be set on a subband by subband basis. In FIG. 5, NL1 to NL6 are noise judgment levels set for the individual subbands. The amplitudes x1 to x6 of the subbands are inputted to comparators 34 for comparison with the noise judgment levels NL. A maximum band detector 35 produces a signal MAX BAND corresponding to a subband whose amplitude y is a maximum almong the subbands whose amplitudes x are greater than their respective noise judgement levels NL.

A controller 33 sets the bandpass filter 24 (see FIG. 2) to a band having signal MAX BAND in the center thereof. For example, when a waveform, wherein noise having a high frequency subband SUB2, is superposed on a signal having a low frequency subband SUB5, as shown in FIG. 7(a) and is inputted, spectra shown in FIGS. 8(a) and 8(b) are obtained. In this example, the maximum band detector 35 judges the subband SUB5, whose amplitude y is maximum, as shown in FIG. 8(b), among the subbands SUB2, SUB4, SUB5 and SUB6, whose amplitudes x are greater than their respective noise judgment levels NL, as shown in FIG. 8(a), to be the signal. Accordingly, the controller 33 sets the pass band of the bandpass filter 24 to be as shown in FIG. 8(c). Thus,a signal shown in FIG. 7(b) is obtained as the output of bandpass filter 24.

Returning to FIG. 5, the output NJ of the maximum band detector 35 provides a high state when the amplitude x of at least one subband is higher than the noise judgment level NL thereof, or provides low state when the amplitudes x of all the subbands are lower than the noise judgment levels NL thereof.

FIG. 9(a) shows an example of a spectrum when the flow rate is zero. The amplitude x of all the subbands are lower than their respective noise judgment levels NL. In that case, the maxium band detector 35 sets the output NJ to a low state.

The controller 33 controls the bandpass filter 24 according to a signal NJ_DATA previously set therein, and the bandpass filter 24 cuts off the output thereof when the output NJ is in a low state. Also, the bandpass filter 24 is set to a pass band having the minimum flow velocity in the center thereof, as shown in FIG. 9(b). Noise immunity increases when the bandpass filter 24 cuts off the output thereof. By setting the pass band of the bandpass filter 24 to be as shown in FIG. 9(b), it is possible to rapidly start tracking the flow rate as it rises.

There is no guarantee that spectrum analysis will be performed in a normal manner, as discussed above, when a signal becomes saturated. On the other hand, when the signal is saturated, the signal is sufficiently large and the effect of noise is minimal. As shown in FIG. 10(a), a saturation detection level SL is set so as to be lower than the amplitude x of a subband when the signal is saturated.

Returning to FIG. 5, a saturation detector 37 outputs a low state when the amplitudes x of all subbands are lower than the saturation detection level SL, or outputs a high state when the amplitude x of at least one subband is higher than the saturation detection level SL. The controller 33 judges the vortex signal to be sufficiently large when the output SJ of the saturation detector 37 goes high, thus widening the pass band of the bandpass filter 24 according to a preset signal SJ-DATA, as shown in FIG. 10(b).

The noise judgment levels NL, saturation detection level SL, GAIN1 to GAIN6, NJ_DATA, and SJ_DATA are parameters determined according to such conditions as diameter, range of flow velocity, and fluid density. It is possible to remove superposed noise even when the bandwidth thereof is within a given signal bandwidth. This permits flow rate measurement to be provided with increased stability.

Figure 11:
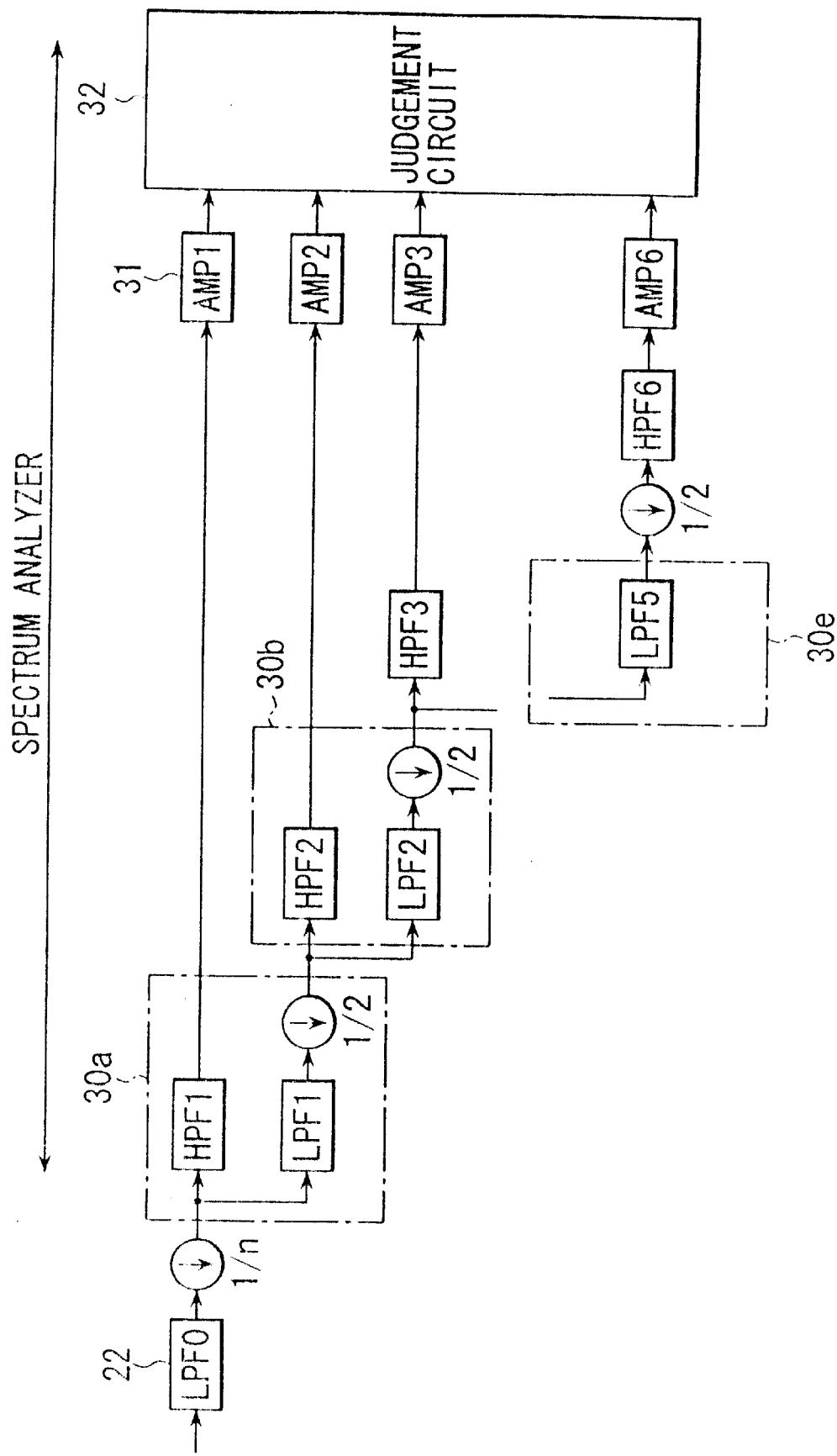
FIG. 11 is a diagram depicting a subband filter used in the invention.

The operation of the subband filters 30, of FIG. 3, that are used in the invention and located after the low pass filter 22, will now be discussed with reference to FIG. 11, which is a detailed description of the subband filters 30 shown in FIG. 3. In FIG. 11, the low pass filter 22 is shown as LPF0 and the high pass filters and the low pass filters comprising the subband filters 30a to 30e are shown as HPF1 to HPF6, and LPF1 to LPF5. The filters are moving average filters that comprise adders and delay elements, such as registers. As indicated by the symbol ↓½, the sampling rate is decimated by half each time the signal passes through a low pass filter. A digital filter, in principle, comprises: multipliers, adders, and delay devices, such as registers. The multiplier, among other components, tends to be of large hardware structure.

The LPF0, indicated by symbol 22 in FIG. 11, is a low pass filter having a band determined by the diameter and flow rate range and is a moving average filter than comprises adders and delay elements, such as registers. The sampling rate of the output of the LPF0 is decimated according to that band. The LPF1 to LPF5 are moving average filters of the first order, or of the second or greater order. The transfer function of a first order moving average filter is represented as follows:

$$(1+Z^{-1})/2 \qquad 1$$

The transfer function of an nth order moving average filter is represented as follows:

$$[(1+Z^{-1})/2]^n \qquad 2$$

After being processed by the moving average calculation, the sampling rate of the output of each filter is decimated by half.

The HPF1 to HPF6 are high pass filters whose transfer functions are represented as follows:

$$(1-Z^{-1})/2 \qquad 3$$

or $$[(1-Z^{-1})/2]^n \qquad 4$$

which is the n-th order representation of equation 3.

Figure 12:
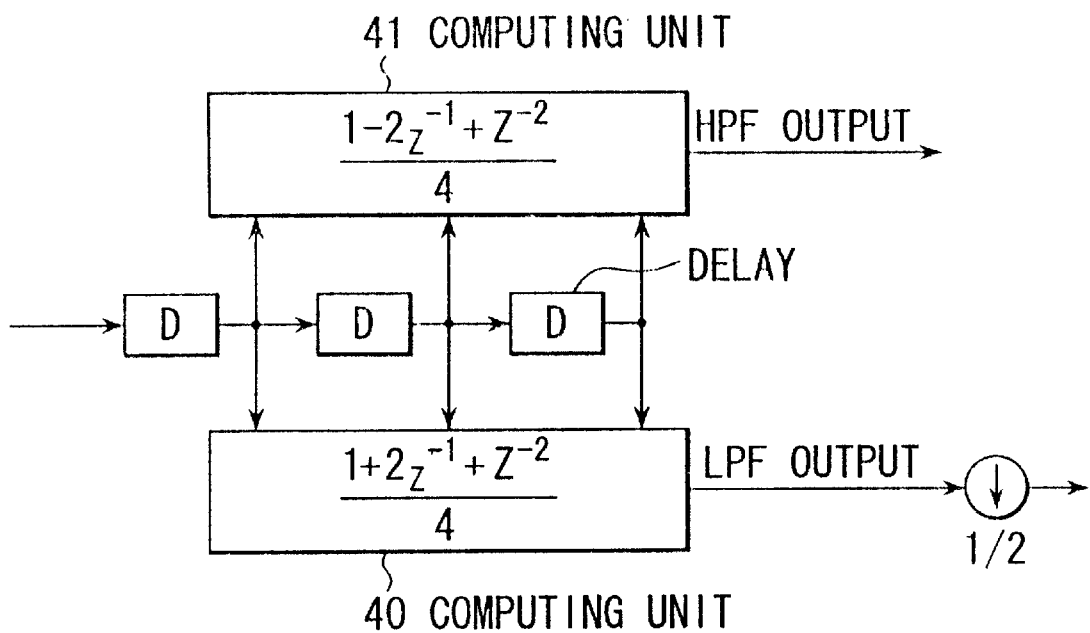
FIG. 12 is a diagram depicting a subband filter used in the invention, wherein when both the LPF and HPF thereof are second order filters.
Figure 13:
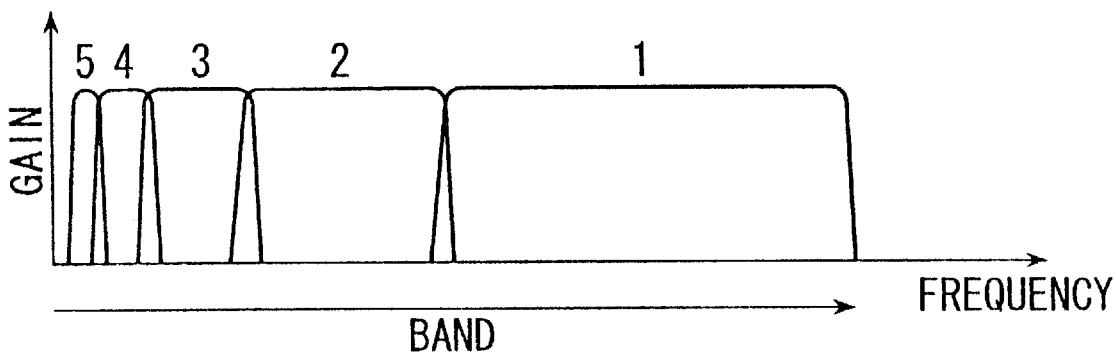
FIG. 13 is a graph depicting a filter which splits the band into component bands with the widths of each two adjacent component bands being in the ratio of 1 to 2.

FIG. 12 shows a subband filter when both the LPF and HPF thereof are second order filters. The bandpass filter is formed by connecting computing units 40 and 41 in parallel to the back of each delay element D1. With the foregoing filters, it is possible to provide a filter that splits a band into subbands with the widths of every two adjacent subbands being in the ratio of 1 to 2, as shown in FIG. 13. Although the subbands share the same transfer function, they have different bandwidths because the sampling rate of the output thereof is decimated after moving average calculation. The filter may comprise adders, subtractors and delay elements D only. Since the filter does not require a general purpose multiplier, it will be of small size hardware construction.

Figure 14:
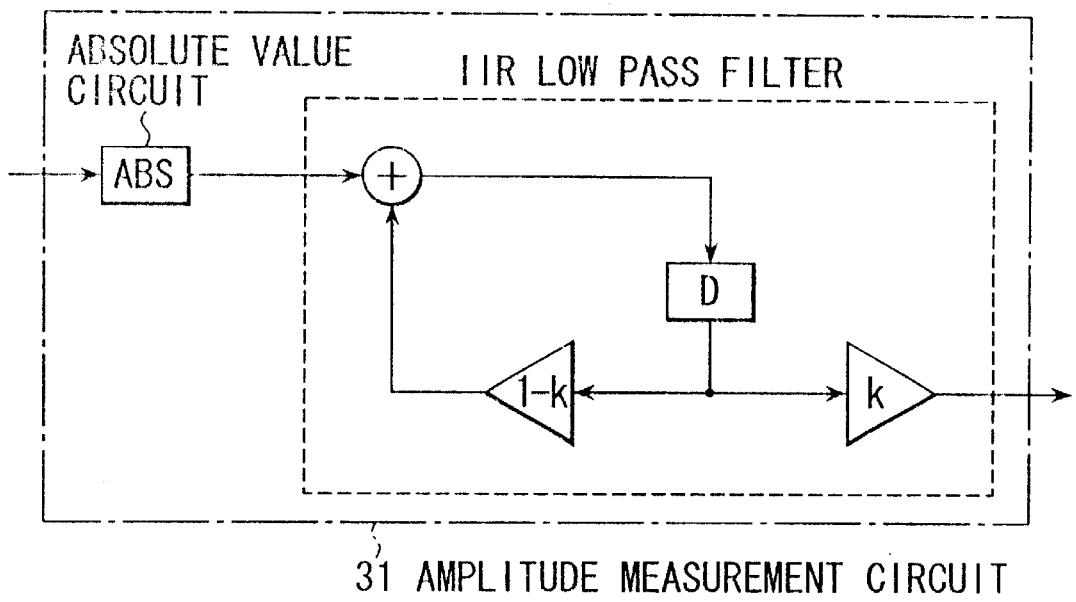
FIG. 14 is a diagram depicting an amplitude measurement circuit used in the invention.
Figure 15:
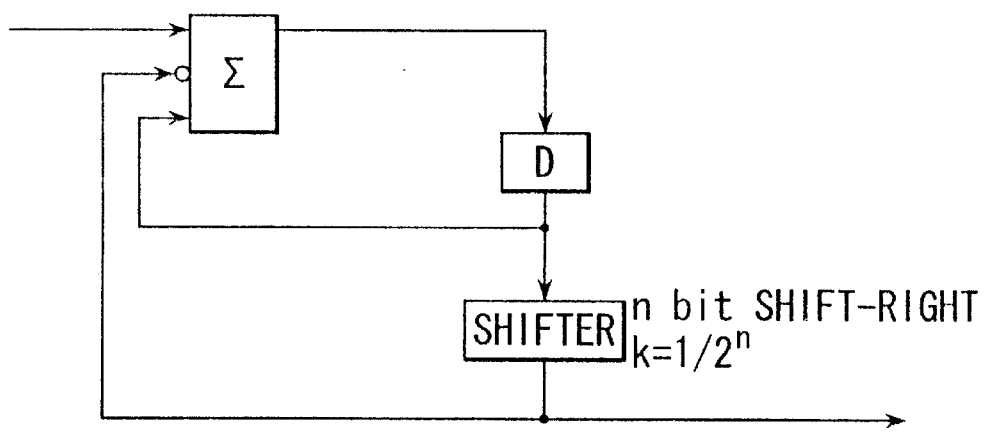
FIG. 15 is a diagram depicting an amplitude measurement circuit comprising a shifter, an adder, a subtractor, and a delay element.

FIG. 14 shows an amplitude measurement circuit 31, which corresponds to each of AMP1 to AMP6 of FIG. 3 or 11. The amplitude measurement circuit 31 comprises an absolute value circuit ABS and IIR low pass filter. In FIG. 14, a coefficient "k" has the value which satisfies the relationship 0<k<1. The IIR low pass filter comprises a shifter, an adder, a subtractor and a delay elements, as shown in FIG. 15. If, for example, the shifter is designed to shift right three bits (i.e. multiply by ⅛), the filter of FIG. 13 can be configured so that k=0.125 and 1−k=0.875. The filter only requires an adder, a subtractor, and a delay element. Thus, it also is of small hardware construction.

Since filters for spectrum analysis perform decimation of the sampling rate by half, they differ from one another only in the data of a memory device for each subband, such as a register. Accordingly, it is possible for the filters to share a common computing unit and process data using the same calculation, without being dependent on the band.

Figure 16:
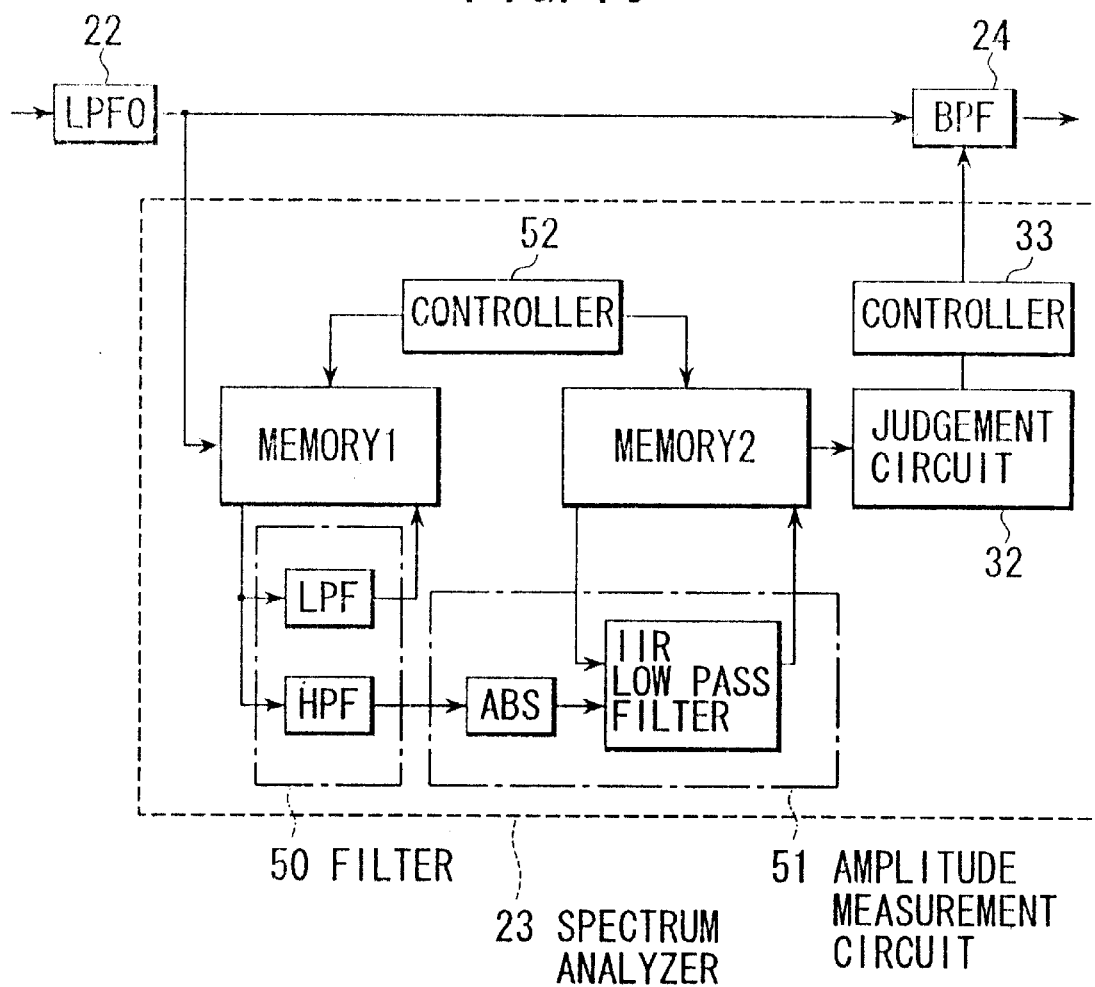
FIG. 16 is a diagram depicting a spectrum analyzer used in the invention.

FIG. 16 shows spectrum analyzer 23 (see also FIG. 2, or 3 or 11) comprising a computing block 50 for performing filter calculations (see also FIG. 12); MEMORY1 used to perform calculations for LPF; MEMORY2 used to perform calculations for IIR low pass filter of an amplitude measurement circuit 50 (see also FIG. 14); and a controller for controlling the foregoing memory devices MEMORY1 and MEMORY2. The signal decimation by half makes it possible for the filters to share the same computing unit, thereby reducing the number of components.

The pass band of the bandpass filter BPF 24 (see also FIG. 2, 3 or 16) is controlled according to the results of the spectrum analysis. A bandpass filter is in principle a combination of a low pass filter and a high pass filter. It is possible to exclude the low pass filter, by configuring the bandpass filter 24 in the manner shown in FIG. 17.

Figure 17:
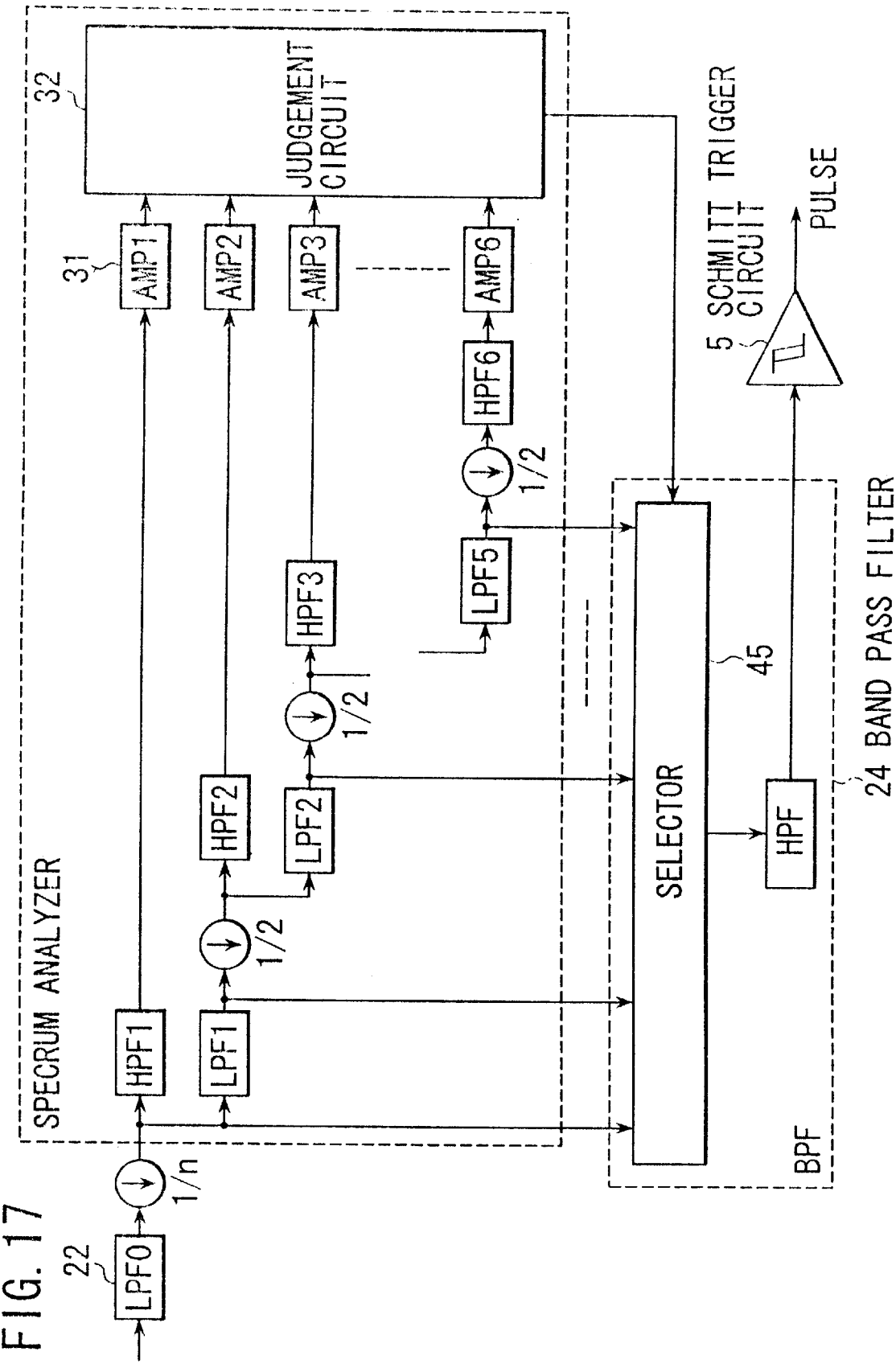
FIG. 17 is a diagram depicting a bandpass filter used in the invention and comprising a selector and high pass filters.

As discussed, the bandpass filters SUB1 to SUB6 are used, as shown in FIG. 3 or 11, in order to perform spectrum analysis. In the invention, however, the bandpass filters are first arranged as a low pass filter and then as a high pass filter, as shown in FIG. 17. In FIG. 17, LPF0 to LPF5 are low pass filters having different bands. The low pass filters LPF0 to LPF5 are equivalent to variable bandwidth low pass filters when a selection is made from the output signals from low pass filters LPF0 to LPF5.

In terms of hardware design of the bandpass filter 24, the variable bandwidth low pass filter is replaced with a selector 45, thereby dramatically reducing the hardware scale. For the spectrum analysis in the invention, the subband filters are configured so that a given band is split into subbands with the widths of every two adjacent subbands being in the ratio of 1 to 2 and the output signal from each subband filter being decimated by half.

In other words, the sampling rate, at which the output signals from the low pass filters LPF0 to LPF5 in FIG.17 are sampled, differ between every two adjacent filters in the ratio of 2 to 1. Selecting from the output signals of the low pass filters LPF0 to LPF5 causes the sampling rate of a high pass filter HP comprising a bandpass filter BPF 24 to change at the same time. Hence, the transfer function of the high pass filter HPF is automatically changed as a result of a change in the sampling rate. Accordingly, no circuit is necessary for controlling the band of the high pass filter HPF and simplicity in hardware configuration is attained.

The bandpass filter comprising the subband filters for spectrum analysis have relatively narrow bands for the benefit of improved frequency resolution. For this reason, none of the bandpass filters is used as the bandpass filter BPF24, for shaping the vortex waveforms. Furthermore, the BPF 24 needs to have a relatively wide band in order to be able to suitably track the vortex frequency in time when the frequency changes. For example, if the band of a vortex signal lies in SUB3 in FIG. 4, the band of the BPF 24 must be configured so as to be as wide as from SUB2 to SUB4. In this example, the LPF2 and HPF3 in FIG. 17 correspond to SUB3. The selector 45 of the BPF 24 selects the output signal from LPF1, comprising SUB2, rather than the LPF2 comprising SUB3. The HPF is designed so that the band thereof, at the sampling frequency when the LPF1 is selected, forms the lower frequency side band of the SUB3. At this point, the band of the HPF need not be precisely adjusted to that of SUB4.

Moreover, the BPF 24 is not limited to the band above discussed. If noise immunity is a top priority, such a relatively narrow band as noted above may be appropriate. If traceability of vortex frequency is a top priority, it is possible to configure the BPF 24 so that the band thereof covers SUB1 to SUB5 for a signal of SUB3.

As discussed priorly, in one example, noise, occurring during measurement of only one type of fluid, is removed and a frequency band, having a maximum amplitude, is identified as a vortex signal. Advantageously, the vortex flowmeter of the invention automatically discriminates between liquids and gases or steam and serves also as a flowmeter for measuring both of the fluids without needing any changes, for example, in converter settings.

On the other hand, in a conventional method of flow rate measurement, the converter of a vortex flowmeter requires a bandpass filter for liquids and a separate bandpass filter for gases. The output signal from either of these different bandpass filters is then pulsed by a Schmitt trigger located after the filters and then the signal frequency is determined. When the frequency is a vortex frequency within a liquid domain, an output signal is provided by using a signal processed by the filter for the liquids. When the frequency is a vortex frequency within a gas domain, an output signal is provided by using a signal processed by the filter for the gases. Since this conventional method judges the type of fluid only by the frequency, the conventional method is limited to vortex frequencies for the liquid and gas domains which do not overlap each other.

Figure 18:
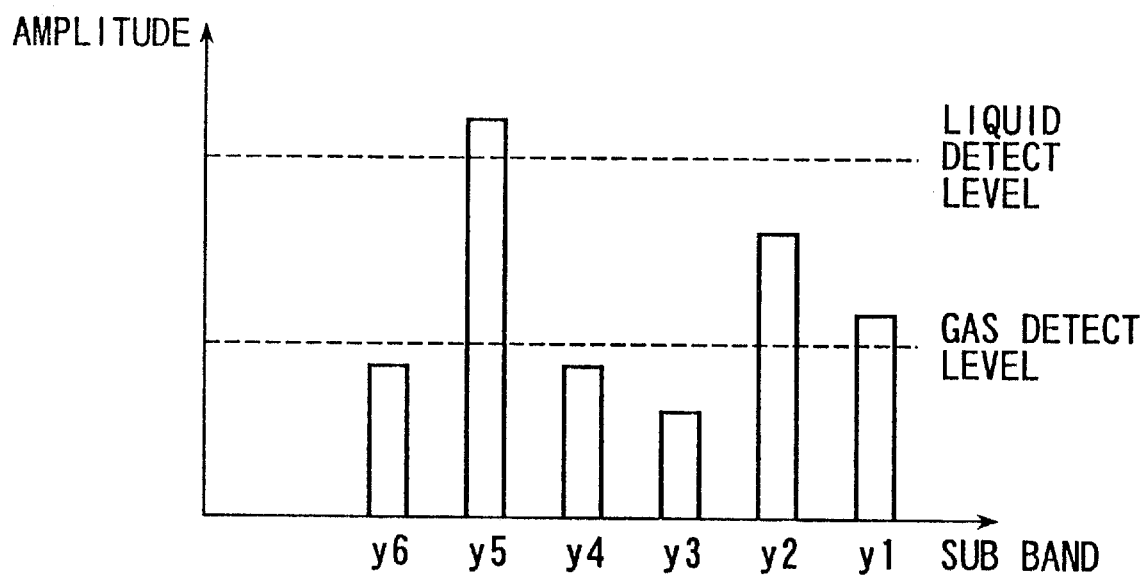
FIG. 18 is a graph depicting lines for discriminating liquids from gases according to the relationship between the amplitude and the frequency of each subband.

Advantageously, in the invention, a liquid detection level and a gas detection level are defined according to the relationship between the subbands and amplitudes thereof, as shown in FIG. 18. The detected frequency and amplitude are compared with setpoints within the CPU of the microprocessor 7 of FIG. 2. When the amplitude is at or above the liquid detection level, the signal of the fluid being measured is outputted as that of a liquid. When the amplitude is at or above the gas detection level but below the liquid detection level, the signal of the fluid being measured is outputted as that of a gas. Thus, a signal is outputted according to the setting defined for each type of fluid. Hence, clarity and reliability are assured by the invention.

In the graph of FIG. 18, signal band y5 shows that the fluid being measured is a liquid. In this graph, a signal with an amplitude below the gas detection level is judged to be noise and the flowmeter output is cut off. This judgment is not limited to classification of fluids into liquids and gases. If there is a certain degree of difference in the fluid density, it is possible to discriminate among a plurality of gases or a plurality of liquids, and thus, switch the flowmeter output accordingly.

Figure 19:
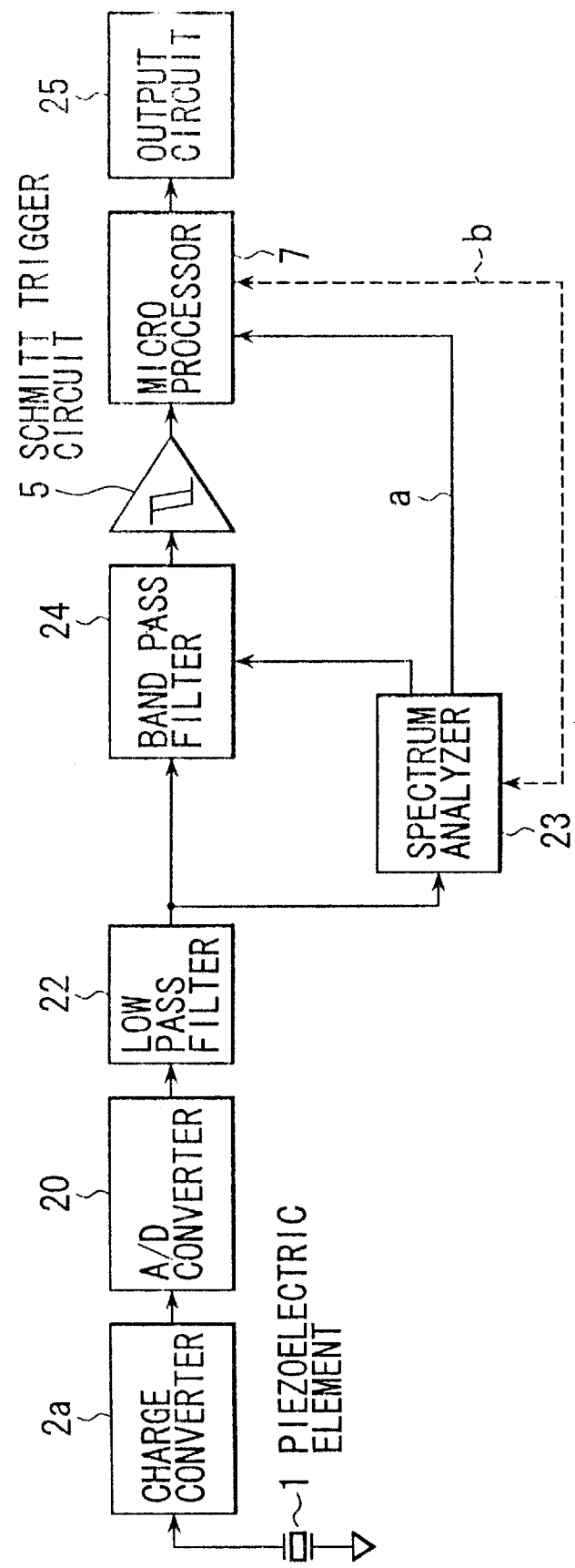
FIG. 19 is a diagram deicting another embodiment wherein a signal line is added to measure fluids having a plurality of density levels.

FIG. 19 shows added signal lines "a" and "b" to the embodiment of FIG. 2. This second embodiment is useful to measure fluids having a plurality of density levels. The signal line "a" carries a status signal for informing the CPU or microprocessor 7 of the result of judgment as to whether the measurement is of a liquid or a gas is made by the spectrum analyzer 23. Using the status signal, the CPU sets the flowmeter output to provide an output corresponding to each individual fluid, for example, 0 to 100% output.

The case where liquids and gases are determined by means of the CPU of the microprocessor 7, the CPU reads the frequency and the amplitude information, as indicated by the dashed line "b". The CPU then sets the output thereof according to the judgment of the information and determines the pass band of the bandpass filter 24 through the spectrum analyzer 23.

The Schmitt trigger 5 used in the invention will be described with reference to FIG. 2, wherein the output of sensor 1 is converted to a voltage signal by means of the charge converter 2a and the voltage signal is converted to a digital signal by A/D converter 20. Then, the digital signal is supplied to the bandpass filter 24 for noise removal and processed into pulses by Schmitt trigger 5. Under normal conditions, a low state output signal from the Schmitt trigger will flip to a high state when the input thereof rises above the trigger level TLH. Conversely, a high state output signal from the Schmitt trigger flips to a low state when the input thereof falls below the trigger level TLL. The Schmitt trigger is thus provided a hysteresis as wide as TLH-TLL, thereby functioning to prevent high frequency noise.

Figure 20:
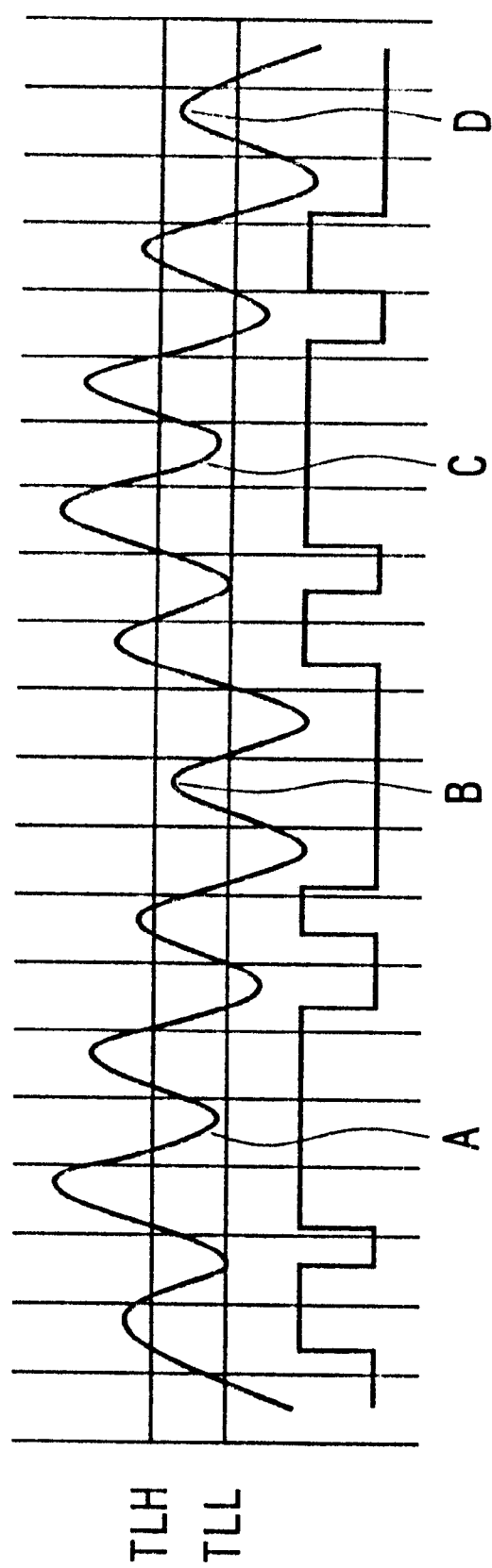
FIG. 20 is a waveform chart depicting low frequency noise superposed on a signal and showing that there are missing pulses.

In the conventional vortex flowmeter, precise flow rate measurement is not possible because of the occurrence of missing pulses, as indicated in FIG. 20 by points A,B,C, and D, when low frequency noise due to vibration, for example, is superposed on a vortex waveform.

Figure 21:
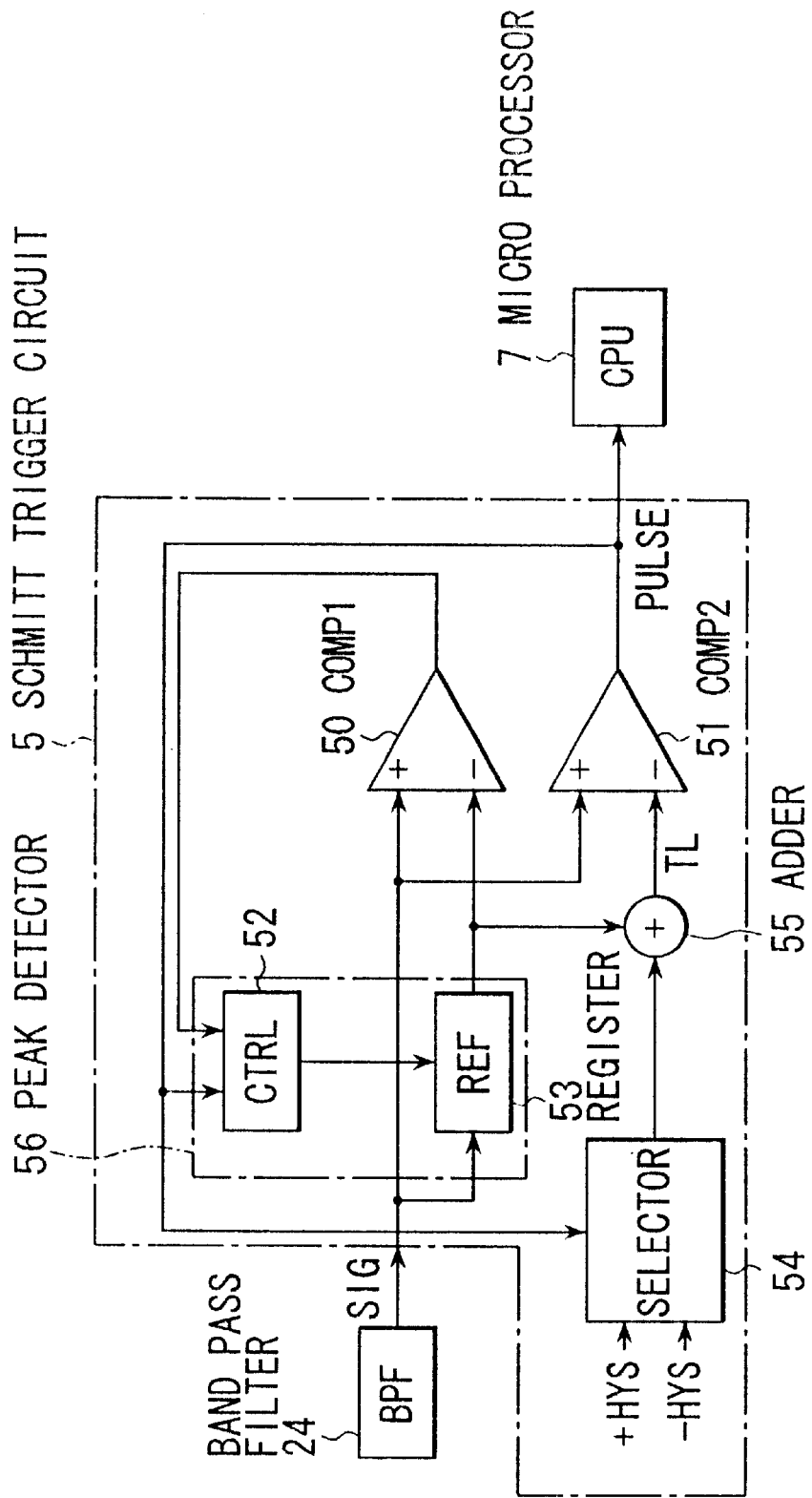
FIG. 21 is a diagram depicting a Schmitt trigger used in the invention.

In contrast, in the invention, precise flow rate measurement is attained, free of missing pulses, because of the conditions discussed above with use of the Schmitt trigger. FIG. 21 shows an embodiment of the Schmitt trigger used in the invention, comprising a first comparator 50 and a second comparator 51 with the output terminal of bandpass filter 24 being connected to the non-inverting (+) terminal of the first and second comparators 50,51. The output terminal of register 53 is connected to the inverting (−) terminal of the first comparator 50 and the output terminal of an adder 55 is connected to the inverting (−) terminal of the second comparator 51.

The output terminal of the register 53 is also connected to one of the two input terminals of adder 55. The output terminal of selector 54 is connected to the other input terminal of adder 55. The output terminals of the first and second comparators 50 and 51 are connected to the two input terminals of controller 52. The output terminal of controller 52 is connected to one of the two input terminals of register 53. The output of the bandpass fiilter 24 is also supplied to the other input terminal of register 53. The output terminal of the second comparator 51 is also connected to the input terminal of selector 54, whereto a positive (+) or negative (−) hysteresis signal, determined by the characteristic of sensor 1 (see FIG. 2) is applied.

The operations of the controller 52 and register 53 which serve as a peak detector 56 are as follows. When a pulse output PULSE is high, the value of register 53 is updated when comparator COMP1 50 is high, that is signal SIG>REF is true. Consequently, the maximum value of signal SIG, after the pulse output PULSE has been changed to a high state, is retained by the register 53. On the other hand, when the pulse output PULSE is low, the value of the register 53 is updated when comparator COMP1 is low, that is signal SIG<REF, is true. Hence, the minimum value of signal SIG, after the pulse output PULSE has been changed to a low state, is retained by register 53.

The selector 54 produces signal−HYS when the pulse output PULSE is high, or produces signal+HYS when the pulse output PULSE is low. Thus, a trigger level TL provided by adder 55 is either (1) the maximum value of signal SIG−HYS, when the pulse output PULSE is high; or (2) the minimum value of signal ISG+HYS, when the pulse output PULSE is low. This means that the trigger level TL is always set according to the peak values.

Figure 22:
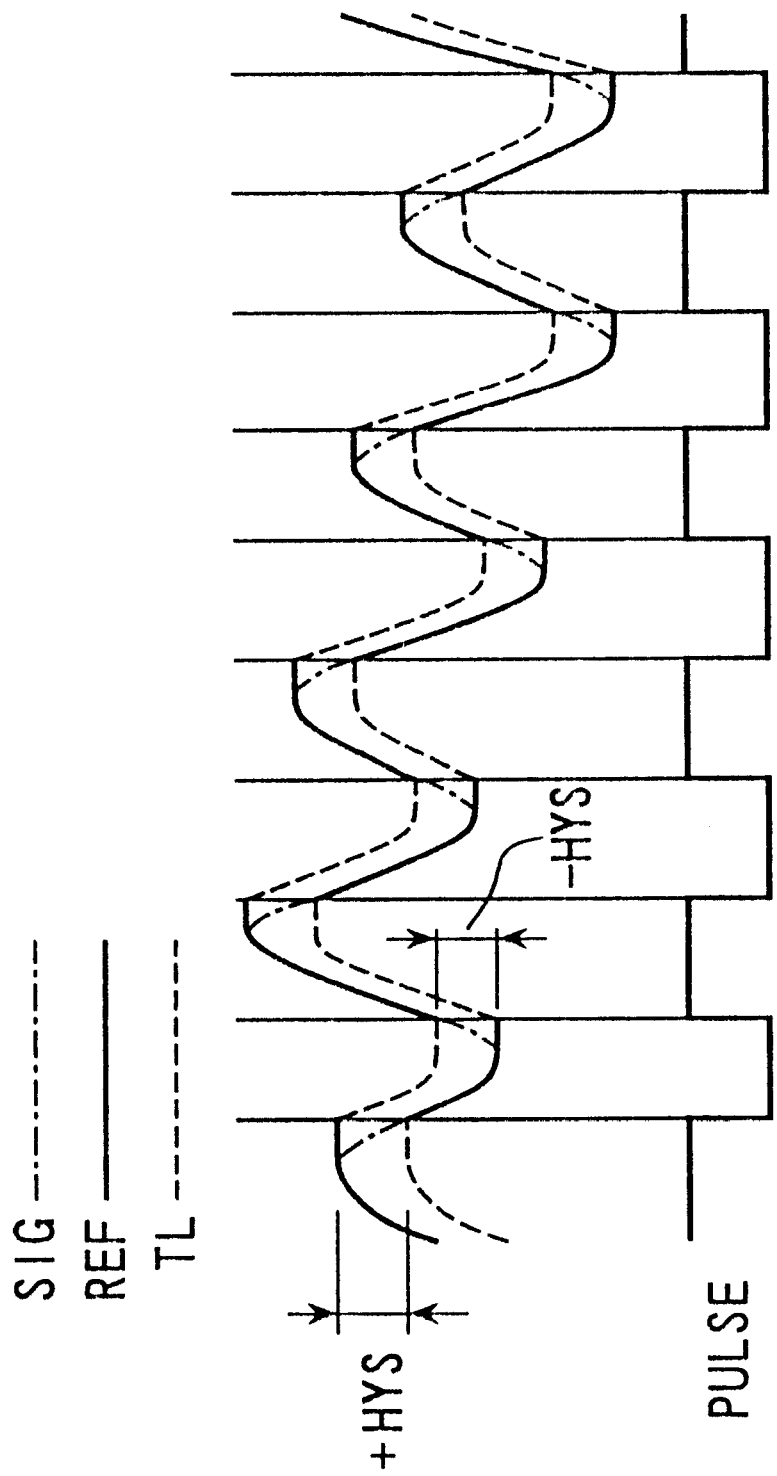
FIG. 22 is a waveform chart depicting when there are no missing pulses even when low frequency noise is superposed on a signal.
Figure 23:
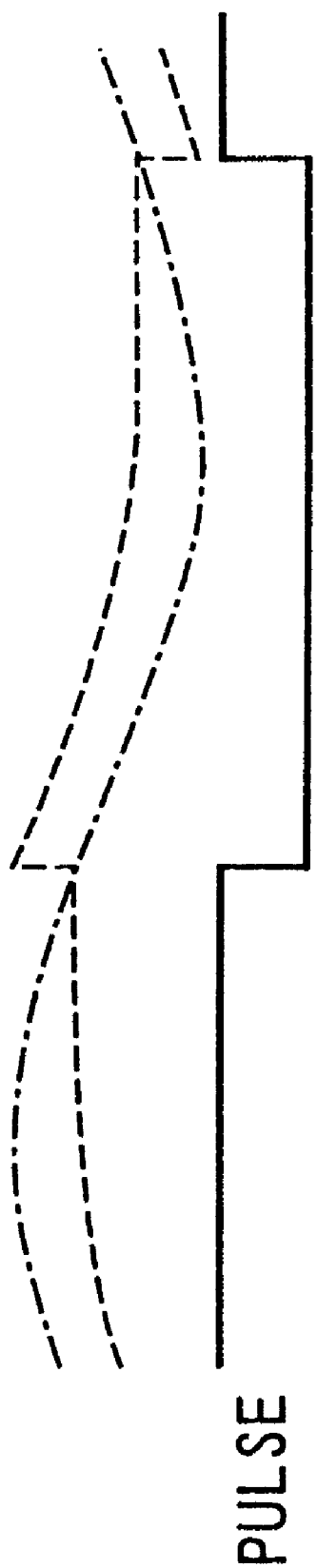
FIG. 23 is a waveform chart depicting when a low frequency signal is pulsed.

FIG. 22 shows the waveform of each signal when low frequency noise is superposed on an output waveform SIG. Since the trigger level TL (indicated by a dotted line) is always set with reference to the peak value, no missing pulses occur in the output signal SIG (indicated by the chain line). Hence, with the invention, precise flow rate measurement is attained. By virtue of the function of the Schmitt trigger 5, it is also possible to correctly pulse low frequency signals, as shown in FIG. 23.

Figure 25:
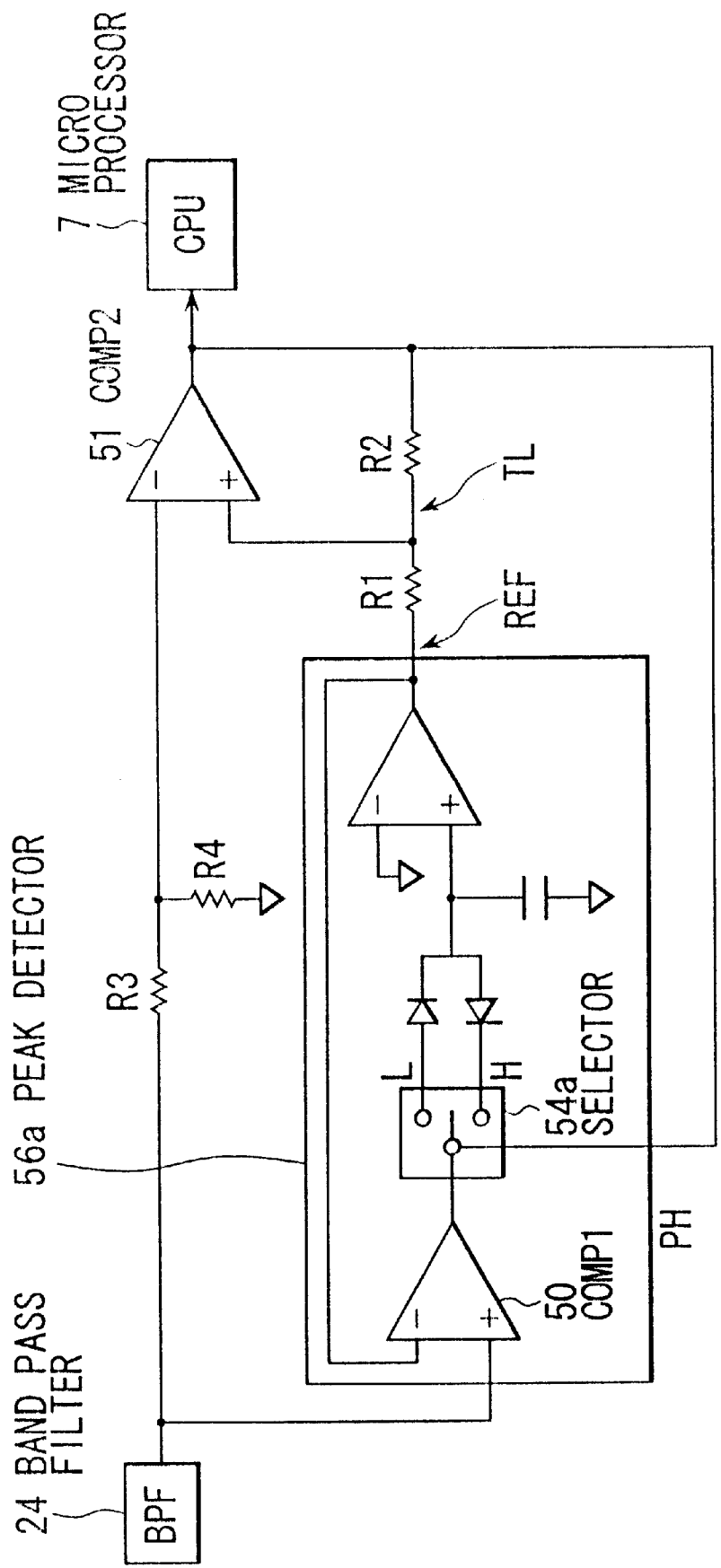
FIG. 25 is a diagram depicting more specific details of a Schmitt trigger, such as the one shown in FIG. 24.

FIG. 25 shows another Schmitt trigger 5 (see FIG. 2) used in the invention, wherein the trigger 5 works as a positive peak detector when the pulse output PULSE of comparator COMP2 51 is high. That is, the maximum value of signal SIG after the pulse output PULSE has been changed to a high state, is retained. On the other hand, when the pulse output PULSE of comparator COMP2 51 is low, the trigger 5 works as a negative peak detector. That is, the minimum value of signal SIG, after the pulse output PULSE has been changed to a low state, is retained. An analog switch 54a (labeled "selector") outputs a maximum value of signal SIG+HYS when the pulse output PULSE is high, or a minimum value of singal SIG−HYS when the pulse output PULSE is low. Hence, the trigger level TL equals the value (maximum value−HYS) when the pulse output PULSE is high, or the value (minimum value+HYS) when the pulse output PULSE is low. Thus, the trigger level TL is always set with reference to the peak value.

FIG. 25 shows another Schmitt trigger wherein a peak detector 56a is designed so that the polarity thereof can be switched by means of a general purpose analog switch. The switch on the upper diode side is turned ON when the pulse output PULSSE is low, so that the peak detector 56a serves as a maximum value detection circuit. Conversely, the switch on the lower diode side is turned ON when the pulse output PULSE of second comparator 51 is high, so that the peak detector 56a serves as a minimum value detection circuit.

Assuming the output signal from the second comparator 5 is ±VCC, the input to the non-inverting (+) input terminal of the second comparator 51 is:

$$TL = \frac{R2}{R1+R2} \cdot REF \pm \frac{R1}{R1+R2} \cdot VCC \qquad 5$$

This is equivalent to the value obtained by adding the following hystereis to the output siganl of the peak hold circuit 56a:

$$\text{Hysteresis} = \frac{R1}{R1+R2} \cdot VCC \qquad 6$$

Assuming that R3=R1 and R4=R2, the input signal applied to the inverting (−) input terminal of the second comparator 51 is as follows:

$$\text{Input} = \frac{R1}{R1+R2} \cdot SIG \qquad 7$$

Figure 24:
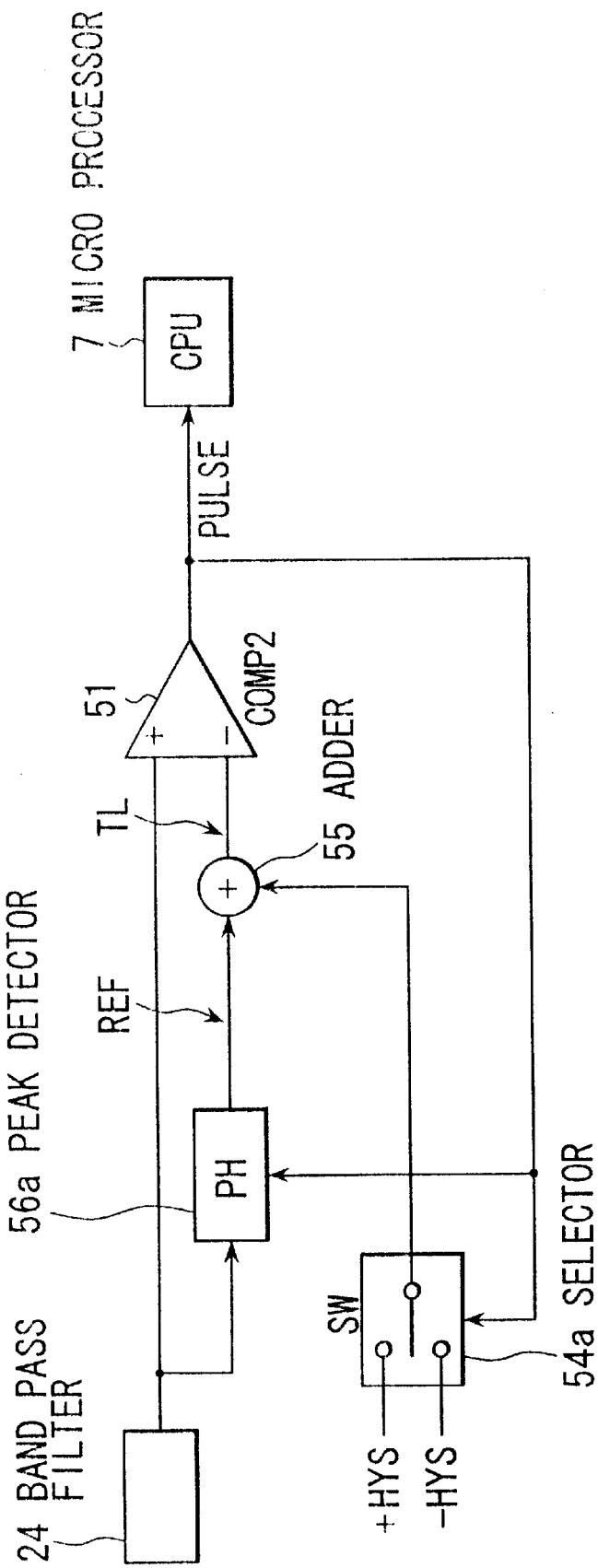
FIG. 24 is a diagram depicting another Schmitt trigger used in the invention.

Thus, the hysteresis±HYS of the selector 54, shown in FIG. 24, equals the following as determined from FIG. 25:

$$\text{Hysteresis} = \pm \frac{R2}{R1} \cdot VCC \qquad 8$$

It is noted that the polarity of the pulse output PULSE outputted by the second comparator 51 in FIG. 25 is reverse that shown in FIG. 24.

According to the invention, the band of a vortex signal whereon noise is superposed is split into a plurality of subbands by means of subband filters so that the frequency components are isolated from the signal. Hence, advantageously, it is possible to effectively remove various types of noises and attain stable detection of flow rate.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A vortex flowmeter for measuring the flow rate of a fluid by detecting an alternating signal produced by Karman vortices, wherein a vortex flow rate signal, obtained by said alternating signal passing through a filter and being converted by an A/D converter to a digital signal, is used for signal processing, said flowmeter comprising:

low pass filter means for passing a frequency band determined by the diameter and flow rate range of said vortex flowmeter;

sub-band filter means for splitting a frequency band passing through said low pass filter means into a plurality of split frequency sub-bands;

spectrum analyzer means for analyzing said plurality of split frequency sub-bands; and band pass filter means for passing a frequency band to be measured according to analysis results from said spectrum analyzer means.

2. The flowmeter of claim 1, further comprising judgment circuit means for identifying a frequency band to be measured by judging amplitudes of said split frequency sub-bands.

3. The flowmeter of claim 2, further comprising amplitude measurement circuit means comprising a combination of an absolute value circuit and a low pass filter, or a combination of a square law circuit and a low pass filter.

4. The flowmeter of claim 1, wherein said plurality of split frequency sub-bands each has a different grain set depending on the band thereof, and a frequency band with maximum amplitude is selected as a band of a vortex frequency.

5. The flowmeter of claim 4, wherein said gain is set to a smaller value for a sub-band in a domain of a higher frequency band.

6. The flowmeter of claim 1, wherein each of said plurality of split frequency sub-bands has an appropriate noise judgment level, and a frequency band of a signal at or above said noise judgment level is selected as a band of a vortex frequency.

7. The flowmeter of claim 1, wherein said plurality of split frequency sub-bands have a plurality of density judgment levels, and a frequency band of a signal above said density judgment level thereof is selected as a band of a vortex frequency.

8. The flowmeter of claim 7, comprising means for displaying a measurement range according to a selected density judgment level.

9. The flowmeter of claim 7, wherein said plurality of density judgment levels are set for liquids and gases.

10. The flowmeter of claim 6, wherein said bandpass filter means has a preset band so that the amplitudes of all frequency sub-bands are below a noise judgment level.

11. The flowmeter of claim 10, wherein said bandpass filter means is set to a band so that the output thereof is zero.

12. The flowmeter of claim 10, wherein said bandpass filter means is set to a band so that a minimum flow velocity is centered thereon.

13. The flowmeter of claim 4, wherein each of said plurality of split frequency sub-bands is set to an appropriate saturation detection level, and said bandpass filter means is set to a preset band so that a signal of any split frequency sub-band is above a saturation detection level thereof.

14. The flowmeter of claim 13, wherein said bandpass filter means has a band which covers overall range of flow velocity.

15. The flowmeter of claim 1, wherein said sub-band filter means comprises a high pass filter means having a transfer function for splitting a frequency band into said plurality of split frequency sub-bands, said transfer function being defined as:

$$(1-Z^{-1})/2, \text{ or } [(1-Z^{-1})/2]^n.$$

16. The flowmeter of claim 2, wherein said low pass filter means comprises shifter means, adder means, subtractor means, and delay means.

17. The flowmeter of claim 1, wherein said low pass filter means is arranged between said A/D converter; and wherein said spectrum analyzer means comprises a moving average filter means.

18. The flowmeter of claim 17, wherein said low pass filter means has a sampling rate of a frequency signal which is decimated according to a frequency band determined by diameter and flow rate range of said vortex flowmeter.

19. The flowmeter of claim 17, wherein said moving average filter means comprises an adder means and a delay means.

20. The flowmeter of claim 1, wherein said low pass filter means and said sub-band filter means both provide moving average calculation and sampling rate decimation.

21. The flowmeter of claim 1, wherein said sub-band filter means performs sampling rate decimation by half; and wherein said sub-band filter means comprises a plurality of sub-band filter means all of which share the same computational expression.

22. The flowmeter of claim 1, wherein said sub-band filter means comprises computing units and perform sampling rate decimation by half, with the computing units being shared for common use by all of the sub-band filter means.

23. The flowmeter of claim 1, wherein said low pass filter means comprises means for shaping vortex waveforms selected according to output from said low pass filter means.

24. The flowmeter of claim 1, wherein said sub-band filter means has a sampling rate which is reduced in the ratio of 2 to 1 between two adjacent filters thereof, whereby the band of a high pass filter in said band pass filter means is automatically changed in shaping vortex waveforms.

25. The flowmeter of claim 1, wherein said band pass filter means has a band set so that bands preceding and following a selected band are included.

26. The flowmeter of claim 1, further comprising a pulsing circuit means located after said band pass filter means; and a trigger level of said pulsing circuit is changed by controlling peaks in an input signal from said band pass filter means.

27. The flowmeter of claim 26, wherein said trigger level is set by means of a hysteresis with reference to output of a peak detector.

28. The flowmeter of claim 27, wherein said peak detector is switched according to polarity of output signal from said pulsing circuit means, thereby serving as a maximum value detection circuit means when said output is high, or serving as a minimum value detection circuit when said output is low.

* * * * *